United States Patent [19]

Matsumoto

[11] 4,272,159
[45] Jun. 9, 1981

[54] OPTICAL CIRCULATOR

[75] Inventor: Takao Matsumoto, Yokosuka, Japan

[73] Assignee: Nippon Telegraph & Telephone Corporation, Tokyo, Japan

[21] Appl. No.: 93,967

[22] Filed: Nov. 14, 1979

[30] Foreign Application Priority Data

Nov. 28, 1978 [JP] Japan .................. 53/146897
Dec. 26, 1978 [JP] Japan .................. 53/162975
Feb. 26, 1979 [JP] Japan .................. 54/21679

[51] Int. Cl.³ .............................. G02F 1/29
[52] U.S. Cl. ............................ 350/375; 350/400
[58] Field of Search ............... 350/149, 150–151, 350/152, 96.13, 96.14, 96.15, 157

[56] References Cited

U.S. PATENT DOCUMENTS 2,745,316  5/1956  Sziklai .......................... 350/150

OTHER PUBLICATIONS

Jarrett et al. "High-Efficiency Single-Frequency CW Ring Dye Laser" 10th Inter. Quantum Electronics Conf., Digest of Tech Papers, p. 634, May 29–Jun. 1, 1978.

Ribbens, W. B. "An Optical Circulator", Applied Optics, 8-1965 pp. 1037–1038.
Jenkins et al. "Fundamentals of Optics", McGraw-Hill, 1950, pp. 499–501.

*Primary Examiner*—William H. Punter
*Attorney, Agent, or Firm*—Pollock, Vande Sande & Priddy

[57] ABSTRACT

An optical circulator in which non-reciprocal polarized light rotating means is disposed between first and second polarizing prisms, the non-reciprocal polarized light rotating means being composed of a Faraday rotator that the polarized light rotating angle, for example, by an external field is 45° and compensating means of an optically active or anisotropic crystal that the polarized light rotating angle is 45°. A light passing through the non-reciprocal polarized light rotating means in one direction is rotated through 90° but a light passing through the non-reciprocal polarized light rotating means in a reverse direction is not rotated. Two input/output faces of each of the non-reciprocal polarized light rotating means and the first and second polarizing prisms, are optically coupled, and the remaining input/output faces of the first and second polarizing prisms, four in all, are used as first through fourth input/output ports, respectively.

5 Claims, 17 Drawing Figures

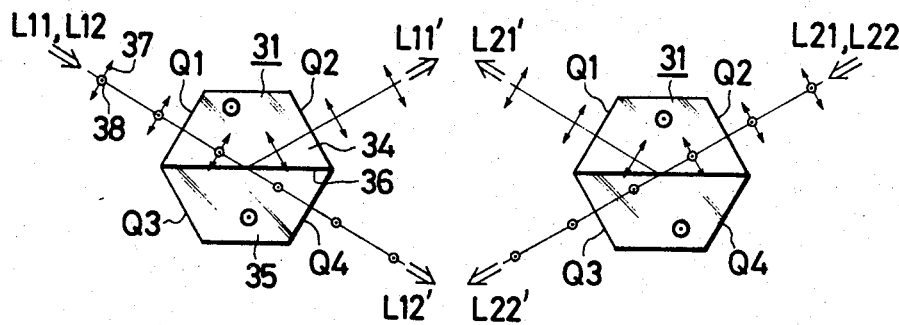
FIG. 4A
FIG. 4B
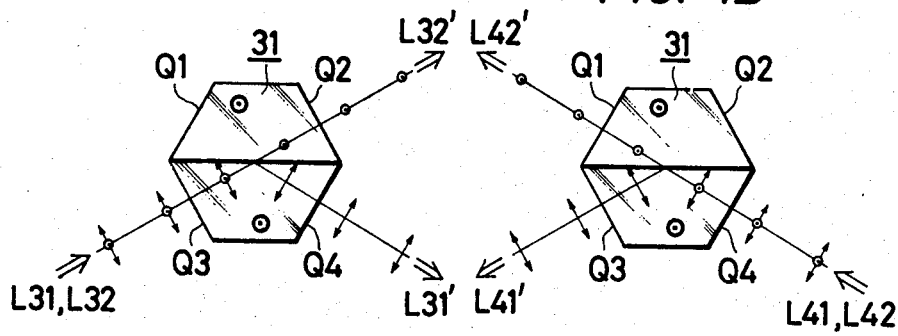
FIG. 4C
FIG. 4D
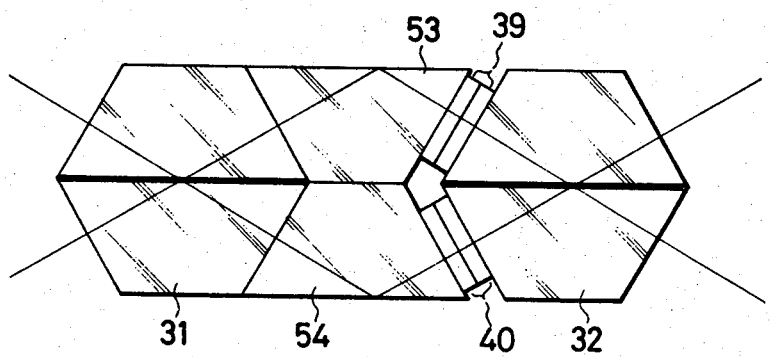
FIG. 6

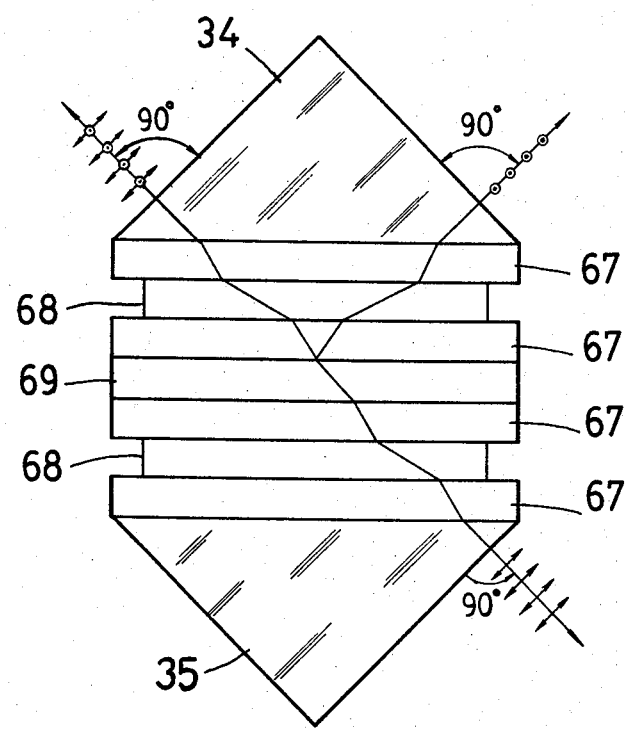
FIG_10

OPTICAL CIRCULATOR

BACKGROUND OF THE INVENTION

This invention relates to an optical circulator which is a kind of optical non-reciprocal device for use as an optical functional device, for example, in an optical communication system, and which is arranged to output an incident light from a first input/output port to a second one, an incident light from the second input/output port to a third one, an incident light from the third input/output port to a fourth one and an incident light from the fourth input/output port to the first one.

A conventional optical circulator is composed of first and second polarizing prisms rotated by 45° relative to each other about their optical axis and a Faraday rotator disposed between the first and second polarizing prisms. The Faraday rotator is an element so constructed that the direction of polarization of an incident light thereto is rotated by 45° by external magnetization. The polarizing prism has the function of changing the optical path of an incident light thereto in accordance with its direction of polarization. The conventional circulator performs its function through utilization of the abovesaid function of the polarizing prism and the relationship between the rotation of a polarized light by the Faraday rotator and the positions of the first and second polarizing prisms rotated by 45° relative to each other about their optical axis. In another conventional optical circulator, use is made of four Faraday rotators wherein the polarized light rotating angle is 45°, and these Faraday rotators are disposed so that optical paths respectively passing therethrough intersect one another at one position and one polarizing prism is disposed at the point of intersection. This optical circulator also utilizes the rotation of light polarization by the Faraday rotators and the aforesaid function of the polarizing prism.

These conventional optical circulators respond only to a single linearly polarized light predetermined for each input port and incident light components other than the linearly polarized component become optical loss or leakage. In an optical fiber which is indispensable as a transmission line for optical communications, however, it is known that the polarized state of light is not constant. That is, even if an incident light is a linearly polarized light at an input port, the linearity of the polarized light is lost by propagation over as short a distance as, for example, about 20 cm. Consequently, although light of a semiconductor laser widely employed as a light source for optical fiber communication is linearly polarized, when the semiconductor laser is coupled with an optical fiber, the output light from the optical fiber does not maintain the linearity of the polarized light. Accordingly, an optical circulator intended to be coupled with the optical fiber must be adapted to respond to lights polarized in any directions so as to reduce the loss.

An object of this invention is to provide an optical circulator which is free from polarization dependency, that is, capable of responding to lights polarized in any arbitrary directions.

Another object of this invention is to provide an optical circulator which has excellent isolation characteristics.

Still another object of this invention is to provide an optical circulator whose parts are joined together to be formed as a unitary structure mechanically.

SUMMARY OF THE INVENTION

According to this invention, non-reciprocal polarized light rotating means is disposed in an optical path between first and second polarizing prisms. The first and second polarizing prisms each has four input/output faces and, in each polarizing prism, an incident light to each input/output face is separated into polarized components perpendicular to each other and these components are separately emitted from two of the outer input/output faces. The non-reciprocal polarized light rotating means has two input/output ports and emits an incident light on one of the input/output ports to the other port while rotating its direction of polarization by an odd number of times as large as 90° and conversely outputs an incident light on the other port to the opposite port without rotating its direction of polarization or while rotating it an even number of times as large as 90°. The one input/output port of the non-reciprocal polarized light rotating means is optically coupled with two of the four input/output faces of the first polarizing prism and the other input/output port is optically coupled with two of the four input/output faces of the second polarizing prism. The remaining two input/output faces of the first polarizing prism are used as first and third input/output ports and the remaining two input/output faces of the second polarizing prism are used as second and fourth input/output ports.

A light incident to the first (or third) input/output port is separated by the first polarizing prism into two polarized components perpendicular to each other, and these polarized components are respectively rotated by the non-reciprocal polarized light rotating means through an angle which is an odd number of times as large as 90°, thereafter being combined into an output light from the second (or fourth) input/output port. On the other hand, a light incident on the second (or fourth) input/output port is separated by the second polarizing prism into two polarized components perpendicular to each other, and these polarized components pass through the non-reciprocal polarized light rotating means without polarization rotation or with polarization rotation of an angle an even number of times as large as 90°, and then they are combined into an output light from the third (or first) input/output port. In this way, a light incident on each input/output port is separated into two polarized components and then combined again, so that the optical circulator of this invention is free from polarization dependency.

The non-reciprocal polarized light rotating means is composed of a Faraday rotator wherein the polarization rotating angle by an external magnetic field is an odd number of times as large as 45°, and a compensating means which rotates the direction of polarization of an incident light by an angle an odd number of times as large as 45°. As the polarizing prism, use can be made of a birefringent prism comprising two birefringent crystals that are joined together through a boundary layer, or a multilayer-film prism comprising glass blocks that are joined together with dielectric multilayer films in the boundary layer. In the former case, by forming on both junction surfaces of the boundary layer anti-reflection coatings for reducing reflection of a transmitted light, leakage between the input/output ports in the optical circulator is reduced to provide for enhanced isolation characteristics. As occasion demands, the first and second polarizing prisms and the non-reciprocal polarized light rotating means are joined together to be formed as a unitary structure mechanically.

BRIEF DESCRIPTION OF THE DRAWINGS

FIGS. 4A to 4D are diagrams explanatory of the operation of a polarizing prism;

FIG. 6 is a plan view showing another embodiment of the optical circulator of this invention in which its respective parts are joined together into a unitary structure;

FIG. 10 is an example of a multilayer polarizing prism.

DESCRIPTION OF THE PREFERRED EMBODIMENTS

Figure 1:
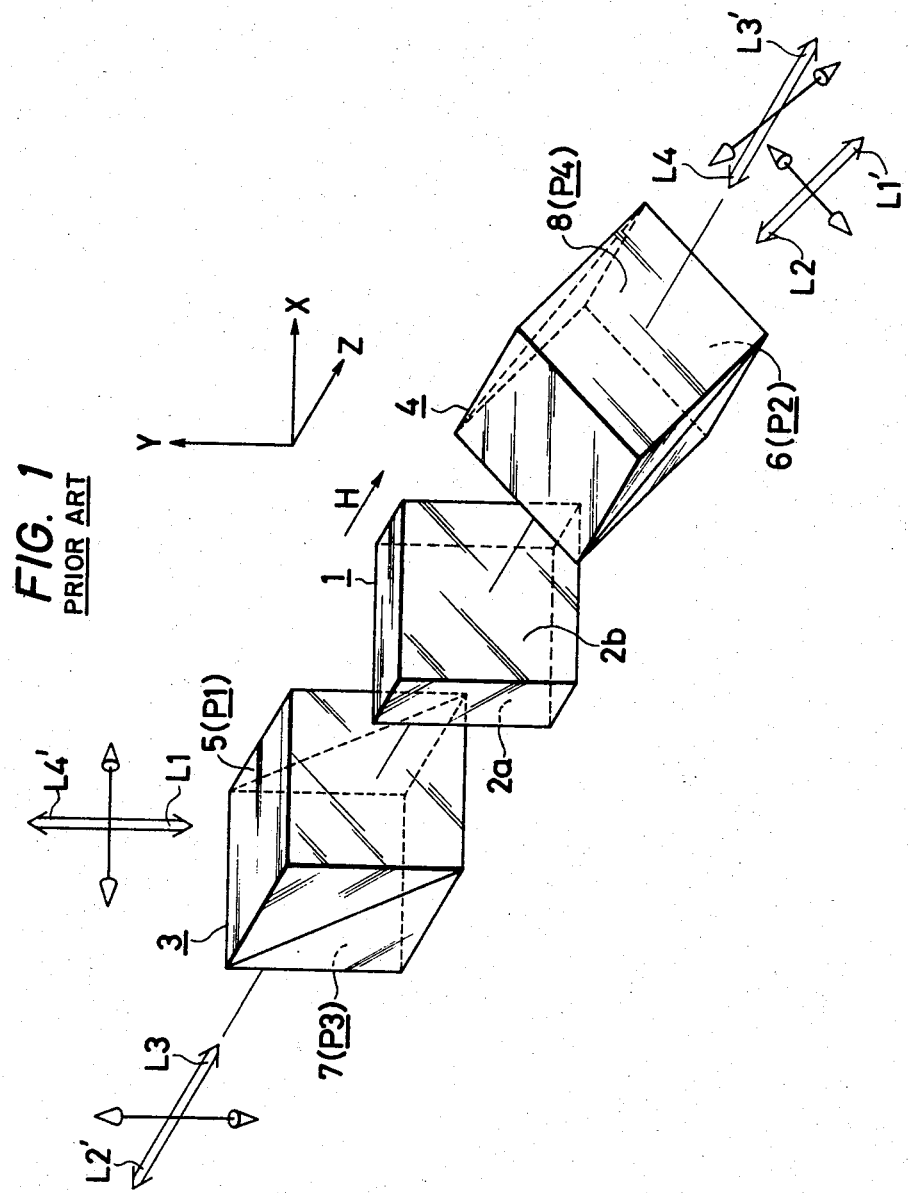
FIG. 1 is a perspective view showing an example of a conventional optical circulator.

Before entering into a description of the present invention, a conventional optical circulator will be described with reference to FIG. 1. Polarizing prisms 3 and 4 are respectively disposed in opposing relation to input and output faces $2a$ and $2b$ of a Faraday rotator 1. The Faraday rotator 1 is adapted so that a polarized light is rotated by 45° in an external magnetic field H perpendicular to the input and output faces $2a$ and $2b$. Let it be assumed that the direction of thickness of the Faraday rotator 1, that is, the direction perpendicular to its input and output faces $2a$ and $2b$, is a Z-axis direction. A face 5 of the polarizing prism 3 extending in the Z-axis direction is used as a first input/output port $P_1$. Assume that a direction parallel to the face 5 and perpendicular to the Z-axis direction is an X-axis direction and that a direction perpendicular to the Z-axis and the X-axis direction is a Y-axis direction. When a light $L_1$ linearly polarized in the X-axis direction is applied to the first input/output port $P_1$, its optical path is bent by the polarizing prism 3 to the Z-axis direction, and the light is directed to the Faraday rotator 1, wherein its direction of polarization is rotated by 45° about the Z-axis, and the light from the Faraday rotator 1 is entered into the polarizing prism 4. The polarizing prism 4 is inclined about the Z-axis at 45° to the polarizing prism 3. As a consequence, the light incident on the polarizing prism 4 from the Faraday rotator 1 is bent at right angles and, from a face 6 of the polarizing prism 4 which is inclined at 45° to the X-Z plane and parallel to the Z-axis, there is emitted a linearly polarized light $L_1'$ which is inclined at 45° to the Y axis direction in the X-Y plane. The face 6 is a second input/output port $P_2$. When a linearly polarized light $L_2$ whose polarization is inclined at 45° to the X-axis direction the X-Y plane is applied to the second input/output port $P_2$, it sequentially passes through the polarizing prism 4 and the Faraday rotator 1 and then enters into the polarizing prism 3, thereafter being provided as an output light $L_2'$ linearly polarized in the Y-axis direction from a face 7 of the polarizing prism 3 which is parallel to the X-Y plane. The face 7 is a third input/output port P3. When a light $L_3$ linearly polarized in the Y-axis direction is applied to the third input/output port $P_3$, a linearly polarized light $L_3'$ whose polarization is inclined at 45° to the Y-axis direction in the X-Y plane is emitted from a face 8 of the polarizing prism 4 which is perpendicular to the Z-axis direction. The face 8 is a fourth input/output port $P_4$. When a linearly polarized light $L_4$ whose polarization is inclined at 45° to the Y-axis in the X-Y plane is applied to the fourth input/output port $P_4$, an output light $L_4'$ linearly polarized in the X-axis direction is derived from the first input/output port $P_1$ of the polarizing prism 3.

In the conventional optical circulator, no output light is derived from the second input/output port $P_2$ unless the incident light on the first input/output port $P_1$ has a linearly polarized component in the X-axis direction, and no output light is obtained from the third input/output port $P_3$ unless the incident light on the second input/output port $P_2$ has a linearly polarized component inclined at 45° to the Y-axis direction in the X-Y plane. Unless the incident light on the third input/output port $P_3$ has a linearly polarized component in the Y-axis direction, no output light is available from the fourth input/output port $P_4$; and unless the incident light on the fourth input/output port $P_4$ has a linearly polarized component inclined at 45° to the Y-axis direction in the X-Y direction, no output light is derived from the first input/output port $P_1$.

Accordingly, in the case where the incident light on the first input/output port $P_1$ contains a linearly polarized component perpendicular to the X-axis direction, that is, a component in the Z-axis direction, the resulting output light from the second input/output port $P_2$ is attended with a loss corresponding to the component in the Z-axis direction with respect to the incident light. Similarly, when the incident light on the second input/output port $P_2$ contains a linearly polarized component in the Z-axis direction, the resulting output light from the third input/output port $P_3$ is attended with a corresponding loss. Where the incident light on the third input/output port $P_3$ contains a linearly polarized component in the X-axis direction, the resulting output light from the fourth input/output port $P_4$ suffers a loss correspondingly, and also when the incident light on the fourth input/output port $P_4$ contains a linearly polarized component perpendicular to a direction inclined at 45° to the Y-axis direction in the X-Y plane, the resulting output light from the first input/output port $P_1$ suffers a loss correspondingly.

Figure 2:
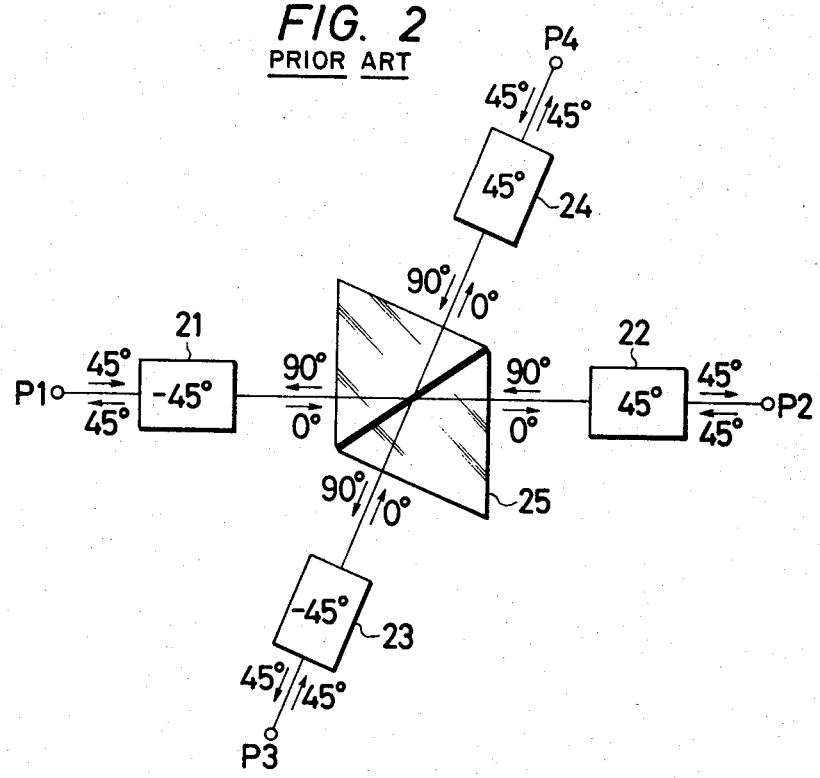
FIG. 2 is a plan view showing another example of the conventional optical circulator.

There has also been employed heretofore an optical circulator such as shown in FIG. 2 in which four Faraday rotators 21, 22, 23 and 24 are disposed in the same plane in such a manner that optical paths respectively passing through the rotators cross one another at one point, where a polarizing prism 25 is placed. In this case, the Faraday rotators 21 and 24 are disposed on one side of the plane of junction of the polarizing prism 25, and the Faraday rotators 22 and 23 are disposed on the other side. The opposite sides of the Faraday rotators 21, 22, 23 and 24 from the polarizing prism 25 are used as first, second, third and fourth input/output ports $P_1$, $P_2$, $P_3$ and $P_4$, respectively. The polarization rotating direction of the Faraday rotators 21 and 23 and that of the Faraday rotators 22 and 24 are respectively selected to be opposite to each other and the polarization rotating angle of each Faraday rotator is selected to be 45°.

When applied to the Faraday rotator 21 from the first input/output port $P_1$, a linearly polarized light inclined at 45° to the figure plane is rendered into a linearly polarized light inclined at 0° to the figure plane and applied to the polarizing prism 25 and then the Faraday rotator 22, deriving from the second input/output port $P_2$ a linearly polarized light inclined at 45° to the figure plane. When a linearly polarized light inclined at 45° to the figure plane is applied to the second input/output port $P_2$, it is rendered by the Faraday rotator 22 into a linearly polarized light inclined at 90° to the figure plane and is entered into the polarizing prism 25, wherein it is bent toward the Faraday rotator 23, thereafter being derived from the third input/output port $P_3$, as a linearly polarized light inclined at 45° to the figure plane. In a similar manner, an incident light on the third input/output port $P_3$ is emitted from the fourth input/output port $P_4$ of the Faraday rotator 24, and an incident light on the fourth input/output port $P_4$ is emitted from the first input/output port $P_1$.

Also in the prior art optical circulator shown in FIG. 2, if each incident light contains a component other than the linearly polarized light inclined at 45° to the figure plane in a predetermined direction, the component causes a loss corresponding thereto.

As described above, both of the conventional optical circulators respond only to a single linearly polarized incident light predetermined for each input/output port. As a consequence, if the incident light contains a polarized component other than the predetermined linearly polarized component, then the resulting output light is attended with the corresponding loss with respect to the incident light.

Figure 3:
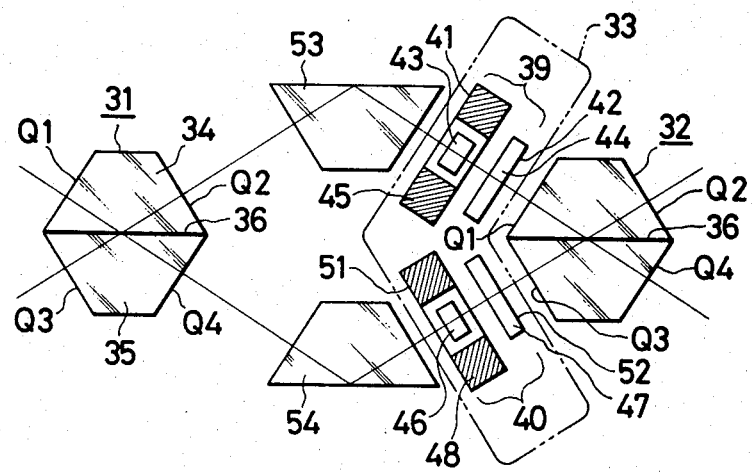
FIG. 3 is a plan view illustrating an embodiment of the optical circulator of this invention.

Referring next to FIG. 3, an embodiment of the optical circulator of this invention will be described. The optical circulator of this invention employs polarizing prisms 31 and 32 and an optical non-reciprocal polarized light rotating means 33 which is disposed on an optical path between the polarizing prisms 31 and 32 and optically coupled therewith. The polarizing prisms 31 and 32 are used to separate or combine polarized light components perpendicular to each other and have four input/output faces $Q_1$, $Q_2$, $Q_3$ and $Q_4$. An incident light to each input/output face is separated into polarized light components perpendicular to each other, which are individually outputted from two of the other input/output faces. In the opposite case, polarized light components perpendicular to each other, which are incident from two input/output faces, are combined into a composite light as an output from one input/output face.

FIG. 3 illustrates the case where the polarizing prisms 31 and 32 are identical in construction with each other. With reference to FIGS. 3 and 4, their specific operative example will be described in respect of the polarizing prism 31. The polarizing prism 31 is composed of two crystal or glass blocks 34 and 35 which are joined together through a boundary layer 36 formed therebetween. On both sides of the boundary layer 36, two input/output faces $Q_1$, $Q_2$ and $Q_3$, $Q_4$ are provided respectively. In FIGS. 3 and 4, the blocks 34 and 35 are each formed by a columnar member which is trapezoidal in section and whose axis is vertical to the sheet, and the bottoms of the blocks respectively corresponding to the base of the trapezoid are joined together through the boundary layer 36. The sides of the trapezoidal columnar block 34 corresponding to both oblique sides of the trapezoid are used as the input/output faces $Q_1$ and $Q_2$, and similar sides of the trapezoidal columnar block 35 are used as the input/output faces $Q_3$ and $Q_4$.

Now, let it be assumed that a light $L_{11}$ is incident on the input/output face $Q_1$ at right angles thereto, as shown in FIG. 4A. The incident light $L_{11}$ is a linearly polarized light which is parallel with the input/output face $Q_1$ and perpendicular to the axial direction of the trapezoidal columnar block 34, as indicated by arrows 37. The incident light $L_{11}$ is reflected by the boundary layer 36 and emitted as an output light $L_{11}'$ from the input/output face $Q_2$. When an incident light $L_{12}$ (indicated by the small symbol $\odot$) which is a linearly polarized light in the axial direction of the trapezoidal columnar block 34 and perpendicular to the direction of polarization of the incident light $L_{11}$ is applied to the input/output face $Q_1$, this incident light is permitted to pass through the boundary layer 36 and emitted as an output light $L_{12}'$ from the input/output face $Q_4$.

As shown in FIG. 4B, when a linearly polarized light $L_{21}$ indicated by arrows is incident on the input/output face $Q_2$ from a direction perpendicular thereto, it is emitted as an output light $L_{21}'$ from the input/output face $Q_1$; and when a linearly polarized light $L_{22}$ perpendicular to the incident light $L_{21}$, indicated by the small symbol $\odot$, is applied to the input/output face $Q_2$, it is derived as an output light $L_{22}'$ from the input/output face $Q_3$. As shown in FIG. 4C, when a light $L_{31}$ linearly polarized in a direction, indicated by arrows, is incident on the input/output face $Q_3$ from a direction perpendicular thereto, it is provided as an output light $L_{31}'$ from the input/output face $Q_4$; and when a linearly polarized light $L_{32}$ indicated by the small symbol $\odot$ is incident on the input/output face $Q_3$, it is derived as an output light $L_{32}'$ from the input/output face $Q_2$. Further, as shown in FIG. 4D, when a linearly polarized light $L_{41}$ indicated by arrows is incident on the input/output face $Q_4$ from a direction perpendicular thereto, it is derived as an output light $L_{41}'$ from the face $Q_3$; and when a linearly polarized light $L_{42}$ indicated by the small symbol is incident on the input/output face $Q_4$, it is derived as an output light $L_{42}'$ from the input/output face $Q_1$.

As such polarizing prisms 31 and 32, a birefringent prism can be used, and the birefringent prism includes, for example, a Glan-Thompson prism using an adhesive material layer as the boundary layer and a Glan-Taylor prism using an air gap as the boundary layer 36, as described in M. V. Klein, "Optics" John Wiley & Sons. The examples of the materials are calcite, rutile, quartz and so on. It is preferred to select the polarizing prism so that the optical axis of the birefringent crystal may be perpendicular to the plane formed by the optical path of an input and output light in the crystal as indicated by the large symbol $\odot$ in FIGS. 4A–4D. This ensures to prevent the disorder of the optical path in the birefringent crystal. It is also possible to employ, as the polarizing prisms 31 and 32, a multilayer film prism sold by CVI Ltd. of U.S.A. under the trade name "Beam Splitter". FIG. 10 shows an example of such a multilayer film prism. One face of each of glass blocks 34, 35 is coated by ZnS layers 67 and a cryolite layer 68, and the two coated faces are bound to each other by a cement layer 69. The thicknesses of the respective layers are suitably selected to provide a multi-layer film polarizing prism of desired characteristics. The explanation and construction of the multilayer film prism are set forth in "Thin-Film Optical Filters" by H. A. Macleod, Adam Hilger Ltd., London, 1969, pages 301–304.

In FIGS. 3 and 4, the polarized light component parallel to the figure plane is shown to be reflected in the polarizing prism and the polarized light component vertical to the figure plane is shown to pass through the polarizing prism, but this is not always the case, i.e. according to the kind of the polarizing prism used, the polarized light component parallel to the figure plane passes through the polarizing prism and the polarized light component vertical to the sheet is reflected in the prism.

Tunning back to FIG. 3, the non-reciprocal polarized light rotating means 33 is shown to be composed of two non-reciprocal polarized light rotating members 39 and 40. The non-reciprocal polarized light rotating member 39 has two input/output ports 41 and 42 and passes therethrough an incident light from the one port 41 as it is or while rotating its direction of polarization an even number of times as large as 90° to provide an output light from the other port 42, and passes an incident light from the port 42 while rotating its direction of polarization an odd number of times as large as 90° to provide an output light from the port 41. Such a non-reciprocal polarized light rotating member 39 comprises, for example, a Faraday rotator 43 for rotating a polarized light incident thereto by an external magnetic field an odd number of times as large as 45° and compensating means 44 for rotating the direction of polarization of the incident light in a constant direction about its direction of incidence an odd number of times as large as 45°. The Faraday rotator 43 and the compensating means 44 are aligned on a common optical path. The Faraday rotator 43 is an element having a magneto-optical effect and, as this element, use can be made of a YIG crystal or Faraday rotator glass, for example. The Faraday rotator 43 has applied thereto a magnetic field parallel with the optical path. In FIG. 3, the Faraday rotator 43 is disposed in a flat, cylindrical magnet 45 with its axis held in parallel with the optical path, and the magnet 45 is magnetized in its axial direction to set up in the cylindrical structure of the magnet 45 a magnetic field in parallel with its axis.

As the compensating means 44, use can be made of, for example, an optically active crystal which rotates the direction of polarization by 45° through utilization of the optical activity of a rock crystal, or the so-called ½ wavelength plate which rotates the direction of polarization by 45° utilizing the anisotropy of an anisotropic material such as a rock crystal or calcite. In FIG. 3, the side of the non-reciprocal polarized light rotating member 39 on the side of Faraday rotator 43 is used as the input/output port 41 and the reverse side on the side of the compensating means 44 is used as the input/output port 42. In the embodiment of FIG. 3, when a light is incident on the input/output port 41, its direction of polarization is rotated through the Faraday rotator 43 by 45° and then rotated through the compensating means 44 by 45° in a reverse direction, emitting from the input/output port 42 an output light having no retention of its direction of polarization with respect to the incident light to the input/output port 41. In the case of a light incident on the input/output port 42, however, its direction of rotation is rotated through the compensating means 44 by 45° and further rotated in the same direction through the Faraday rotator 43 by 45°, providing from the input/output port 41 an output light having its direction of polarization rotated by 90° with respect to the incident light on the input/output port 42. The non-reciprocal polarized light rotating member 40 also comprises a Faraday rotator 46, a compensating means 47 and a magnet 48 and has input/output ports 51 and 52, as is the case with the non-reciprocal polarized light rotating member 39.

The non-reciprocal polarized light rotating means 33 is optically coupled with the two input/output ports of each of the polarizing prisms 31 and 32, especially the input/output ports on both sides of the boundary layer of each polarizing prism. In FIG. 3, the polarizing prisms 31 and 32 are disposed so that the axes of their columnar blocks are parallel to each other and their boundary layers 36 lie in the same plane. Between the polarizing prisms 31 and 32 the non-reciprocal polarized light rotating members 39 and 40 are arranged with the input/output ports 42 and 52 on the side of their compensating means disposed opposite the input/output faces $Q_1$ and $Q_3$ of the polarizing prism 32 and optically coupled therewith, respectively. Between the non-reciprocal polarized light rotating members 39 and 40 and the polarizing prism 31 are respectively disposed trapezoidal prisms 53 and 54 for total reflection use. The trapezoidal prisms 53 and 54 are disposed with their axes held in parallel with the axes of the polarizing prisms 31 and 32; one of the faces of the trapezoidal prism 53 respectively corresponding to its oblique sides is opposite the input/output face $Q_2$ of the polarizing prism 31 and the other face is opposite the input/output port 41 of the non-reciprocal polarized light rotating member 39. Likewise, both oblique faces of the trapezoidal prism 54 are positioned opposite the input/output face $Q_4$ of the polarizing prism 31 and the input/output port 51 of the non-reciprocal polarized light rotating member 40, respectively. Accordingly, the input/output ports 41 and 51 of the non-reciprocal polarized light rotating means 33 are optically coupled with the input/output faces $Q_2$ and $Q_4$ of the polarizing prism 31 through the prisms 53 and 54, respectively.

Those of the input/output faces of the polarizing prisms 31 and 32 which are not optically coupled with the non-reciprocal polarized light rotating means 33, that is, the input/output faces $Q_1$ and $Q_3$ of the polarizing prism 31 and the input/output faces $Q_2$ and $Q_4$ of the polarizing prism 32 are respectively used as first, second, third and fourth input/output ports $P_1$, $P_2$, $P_3$ and $P_4$ of this optical circulator. In FIG. 3, the broken lines indicate optical paths.

Figure 5A:
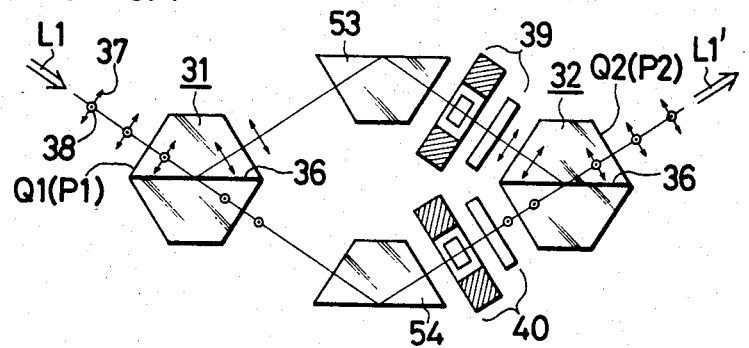
FIGS. 5A to 5D are diagrams explanatory of the operation of the optical circulator shown in FIG. 3.

In the structure described above, let it be assumed that a light $L_1$ is incident on the first input/output port $P_1$ perpendicularly to its input/output face $Q_1$ as depicted in FIG. 5A. The incident light $L_1$ has both a polarized component which is parallel with the input/output face $Q_1$ and perpendicular to the lengthwise direction of the polarizing prism 31 (namely, parallel with the figure plane of FIG. 5A) as indicated by arrows 37, and a polarized component which is parallel with the input/output face $Q_1$ and the lengthwise direction of the polarizing prisms 31 (namely, vertical to the figure plane in FIG. 5A) as indicated by 38 using symbols $\odot$. Accordingly, the incident light $L_1$ is separated by the polarizing prism 31 into the polarized component in the direction indicated by the arrows and the polarized component in the direction of the symbols $\odot$, as described previously with regard to FIG. 4A; the former passes through the prism 53 and the non-reciprocal polarized light rotating member 39 to reach the polarizing prism 32 and the latter passes through the prism 54 and the non-reciprocal polarized light rotating member 40 to reach the polarizing prism 32. The direction of polarization of these lights having thus reached the polarizing prism 32 are not rotated, the component in the direction of the arrow is reflected by the boundary layer 36 of the polarizing prism 32 and the component in the direction of the symbol ⊙ passes through the boundary layer 36; consequently, the two components are combined into a composite light, which is derived as an output light $L_1'$ from the second input/output port $P_2$.

Figure 5B:
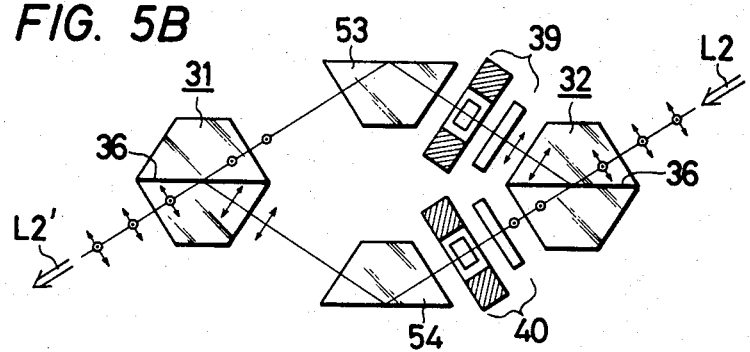

Similarly, as shown in FIG. 5B, when an incident light $L_2$ having polarized components indicated by arrows and ⊙ is incident on the second input/output port $P_2$ perpendicularly thereto, the light $L_2$ is separated by the polarizing prism 32 into the polarized component in the direction of the arrow and the polarized component in the direction of the symbol ⊙. These polarized components respectively pass through the non-reciprocal polarized light rotating members 39 and 40, wherein their direction of polarization is rotated by 90°, namely, the direction of polarization of the component polarized in the direction of the arrow is rotated to the direction of the symbol ⊙ and the direction of polarization of the component polarized in the direction of the symbol ⊙ is rotated to the direction of the arrow. Both components having their direction of polarization rotated respectively reach the polarizing prism 31, in which the component in the direction of the symbol ⊙ is permitted to pass through the boundary layer 36 but the component in the direction of the arrow is reflected by the boundary layer 36, and the both components are combined into a composite light, which is derived as an output light $L_2'$ from the third input/output port $P_3$.

Figure 5C:
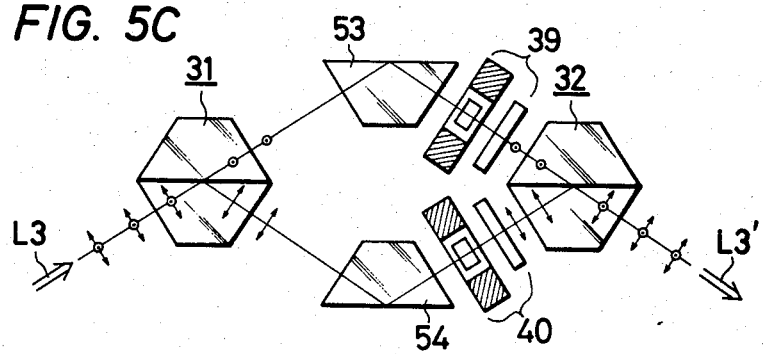
Figure 5D:
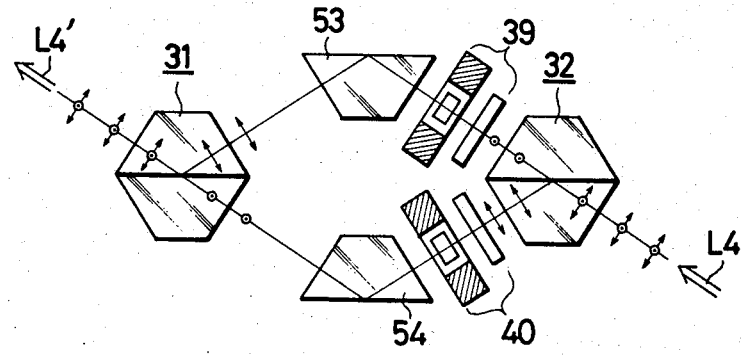

Likewise, as shown in FIG. 5C, a light $L_3$ incident on the third input/output port $P_3$ is separated by the polarizing prism 31 into a component in the direction of the arrow and a component in the direction of the symbol ⊙, and these components respectively pass through the non-reciprocal polarized light rotating members 39 and 40 and are combined by the polarizing prism 32 into a composite light, which is provided as an output light $L_3'$ from the fourth input/output port $P_4$. As depicted in FIG. 5D, a light $L_4$ incident on the fourth input/output port $P_4$ is separated by the polarizing prism 32 into a component in the direction of the arrow and a component in the direction of the symbol ⊙, and these components respectively enter into the non-reciprocal polarized light rotating members 39 and 40, in which they are rotated by 90° in their direction of polarization, and then the components are combined by the polarizing prism 31 into a composite light, which is derived as an output light $L_4'$ from the first input/output port $P_1$.

As described above, in the optical circulator depicted in FIG. 3, an incident light is separated by the polarizing prism 31 or 32 into its linearly polarized components and these components are combined by the polarizing prism 32 or 31 after passing through the non-reciprocal polarized light rotating means 33, so that any polarized components of the incident light are not lost at all. Accordingly, the optical circulator of this embodiment does not cause much insertion loss for any polarized lights regardless of their direction of polarization, and hence performs satisfactory operations in combination with an optical fiber.

Figure 7:
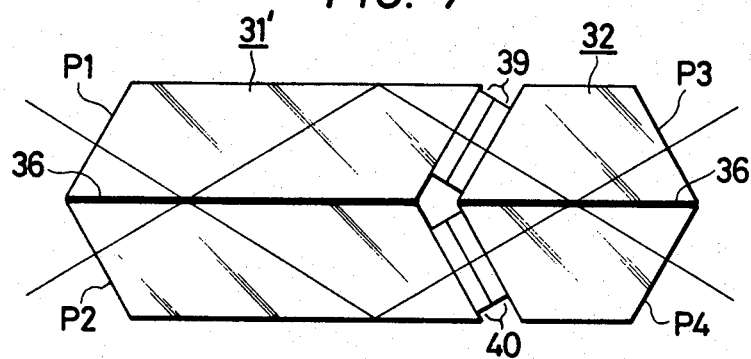
FIG. 7 is a plan view showing another embodiment of the optical circulator of this invention in which its respective parts are joined together into a unitary structure.

In the embodiment of FIG. 3, the polarizing prisms 31 and 32, the non-reciprocal polarized light rotating members 39 and 40 and the trapezoidal prisms 53 and 54 are disposed separately of one another but they can also be formed as a unitary structure, as shown in FIG. 6, in which the mating input and output faces of adjacent ones of them are coupled with each other. It is also possible to omit prism the reflectors 53 and 54 and to provide both or one of the polarizing prisms 31 and 32 with the reflecting function of the prisms 53 and 54. FIG. 7 illustrates, by way of example, an optical circulator structure in which the polarizing prism 31' has the reflecting function. Also, it is possible to dispose one of the non-reciprocal polarized light rotating members 39 and 40, for example, between the polarizing prism 31 and the reflector prism 53 or 54. It is also possible that parts of the same kind in the non-reciprocal polarized light rotating members are formed as a unitary structure. In the case where the non-reciprocal polarized light rotating means is formed by a Faraday rotator and a compensating means, they may be spaced apart, in which case, they may also be disposed on both sides of the reflector. Moreover, in the embodiment of FIG. 3, the trapezoidal prisms 53, 54 may each be replaced by other reflecting means, for example, a metal film, dielectric multilayer film or the like. The trapezoidal prisms 53 and 54 and the reflecting means used as substitutes therefor serve to modify optical paths for coupling the non-reciprocal polarized light rotating members 39 and 40 with the polarizing prisms 31 and/or 32. Accordingly, by suitable selection of the relative arrangements and configurations of the polarizing prisms 31 and 32 and the non-reciprocal polarized light rotating members 39 and 40, both or one of the reflecting means can also be omitted. In FIGS. 3 to 7, a light is described as being applied to each input/output face of the polarizing prism perpendicularly thereto, but the direction of incidence need not always be perpendicular to the input/output face, namely, by suitable selection of the polarizing prism, the incident light may also be applied obliquely to the input/output face.

Figure 8:
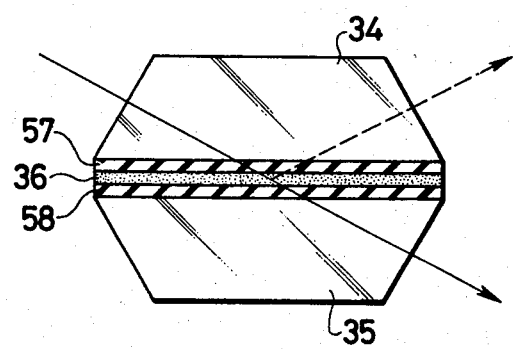
FIG. 8 is a plan view illustrating another example of the polarizing prism.

In order to ensure isolation between the input/output ports of the optical circulator, it is necessary to sufficiently enhance the characteristic of the function of separating polarized components perpendicular to each other at the boundary layer 36 in each of the polarizing prisms 31 and 32. To this end, when birefringent prisms are employed as the polarizing prisms, anti-reflection coatings 57 and 58 are interposed respectively between the blocks 34 and 35 and the boundary layer 36, as shown in FIG. 8. The anti-reflection coatings 57 and 58 are used to match the optical impedances of the blocks 34 and 35 with the boundary layer 36 and may each be formed by a single-layer dielectric coating having a thickness an odd number times as large as $\frac{1}{4}$ of the wavelength of the light used, or a multilayer dielectric coating composed of 20 to 30 dielectric layers, each having a thickness an odd number of times as large as $\frac{1}{4}$ of the wavelength of the light used. As the Faraday rotator, use can also be made of a crystal which has a small Faraday effect and has reflection coatings formed on both input/output faces of the crystal for multiple reflection of an incident light to rotate its direction of polarization by 45° or an odd number of times as large as 45°. Such a Faraday rotator is disclosed, for example, in M. Seki, A. Ueki and K. Kobayashi, "0.8 μm Band Optical Isolator for Fiber-Optic Communication", *Technical Papers of the Topical Meeting on Optical Fiber Communication,* 1979, Washington, D.C., pp 56–58. The relative arrangement of the polarizing prisms 31 and 32, the non-reciprocal polarized light rotating means 33 or the non-reciprocal polarized light rotating members 39 and 40 is not limited specifically to the foregoing embodiments. What is required of this arrangement is to constitute a circulator which has the four input/output ports $P_1$ through $P_4$ and in which a light incident on one of the polarizing prisms is separated into its two polarized components and they are combined by the other polarizing prism into an output light after passing through the non-reciprocal polarized light rotating means. One of the four input/output ports $P_1$ through $P_4$ may also be used as a reflecting face or coupled with a light absorber.

Figure 9A:
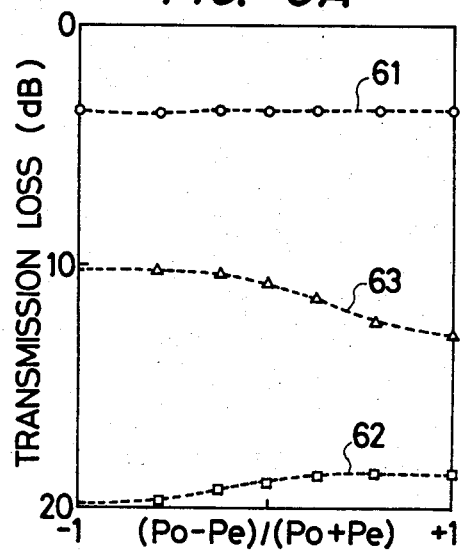
FIGS. 9A and 9B are graphs showing experimental results of the polarization dependency of the optical circulator of this invention.
Figure 9B:
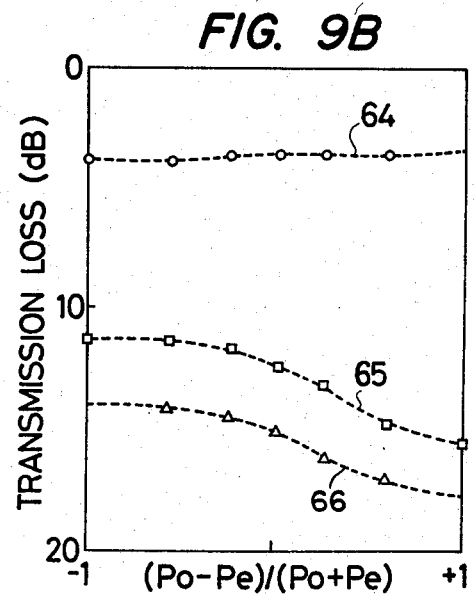

Next, a description will be given of an experimental example of the optical circulator built as a trial in accordance with the embodiment of FIG. 3. The polarizing prisms 31 and 32 were each formed by joining together trapezoidal columnar members of calcite with the boundary layer 36 of an adhesive interposed therebetween. The top and bottom sides, height of the trapezoid were 15.2 mm, 19.0 mm and 5.7 mm and the length of the column in its axial direction was 6.0 mm, and the optical axis was made perpendicular to the plane formed by an optical path. As the Faraday rotators 43 and 46, YIG crystals were used each of which had a thickness of 2.5 mm and a cross-sectional area of $2.4 \times 3.0$ mm, and the direction of light incidence was selected to be [110]. The compensating means 44 and 47 were each formed by a ½ wavelength plate of rock crystal which had a thickness of 0.07 mm and an area of $5.8 \times 6.0$ mm$^2$, and the magnets 45 and 48 were each an Sm-Co ferrite magnet having an axial length of 4.1 mm, an inner diameter of 5.2 mm and an outer diameter of 14.9 mm. The polarization dependency of the optical circulator was measured, with a light of 1.27 μm wavelength applied to the circulator via a polarizer. The results of the measurement are shown in FIGS. 9A and 9B. The abscissa represents $(Po-Pe)/(Po+Pe)$, where Po is the optical power of a polarized component in the direction of the arrow 37 in FIG. 5 and Pe is the optical power of a polarized component in the direction of the symbol ⊙ perpendicular to the first-mentioned component, and the ordinate represents transmission loss. In the case of the light incident on the first input/output port $P_1$, the transmission losses in optical paths to the second, third and fourth input/output ports $P_2$, $P_3$ and $P_4$ were as shown by curves 61, 62 and 63 in FIG. 9A, respectively; and in the case of the light incident on the second input/output port $P_2$, the transmission losses in optical paths to the first, third and fourth input/output ports $P_1$, $P_3$ and $P_4$ were as indicated by curves 64, 65 and 66 respectively in FIG. 9B. The curves 61 and 62 show required loss characteristics of the optical path and these curves are substantially parallel with the abscissa; namely, whether the incident light is polarized in the direction of the arrow or the symbol ⊙, its transmission loss is constant at all times. In other words, FIG. 9 reveals that the optical circulator of this invention is an excellent one that has no polarization dependency.

It will be apparent that many modifications and variations may be effected without departing from the scope of the novel concepts of this invention.

What is claimed is:

1. An optical circulator comprising:
    first and second polarizing prisms each formed by two blocks of optical material joined together with a boundary layer interposed therebetween, said polarizing prisms having on either side of said boundary layer two input/output faces each forming an acute angle with respect to the boundary layer thereby providing each of the first and second polarizing prisms with four input/output faces, said polarizing prisms being operative to separate an incident light on one of said faces into polarized components perpendicular to each other and to emit light individually from two of the other input/output faces, the boundary layers of said first and the second polarizing prisms being disposed in a common plane;
    first and second total reflection prisms disposed respectively on opposite sides of said common plane between said first and second polarizing prisms and each having a coupling face coupled with the corresponding input/output face of the first polarizing prism, an opposing face disposed in parallel with the corresponding input/output face of the second polarizing prism, and a reflection face for totally reflecting an incident light from one of the coupling face and the opposing face to the other; and
    first and second non-reciprocal polarized light rotating means respectively disposed between the first total reflection prism and the second polarizing prism and between the second total reflection prism and the second polarizing prism, each of said non-reciprocal polarized light rotating means having two input/output ports and being operative to emit an incident light from one to the other of said input/output ports while rotating the direction of polarization of said incident light an odd number of times as large as 90°, and being operative to emit an incident light from said other input/output port to said one input/output port without rotating the direction of polarization of said incident light or while rotating the direction of polarization an even number of times as large as 90°.

2. An optical circulator according to claim 1, wherein said blocks of the first polarizing prism and said first and second reflection prisms comprise portions of a unitary structure fabricated of the same material without any coupling junction between the first polarizing prism and said first and second reflection prisms.

3. An optical circulator according to claim 1 or 2 wherein each of said first and second non-reciprocal polarized light rotating means comprises a Faraday rotator which rotates a polarization direction an odd number of times as large as 45° and a compensating means disposed in a common optical path in alignment with said Faraday rotator for rotating the direction of polarization by an odd number of times as large as 45° in a constant direction relative to the direction of incidence.

4. An optical circulator according to claim 1 or 2 wherein at least one of said polarizing prisms is a birefringent prism the crystallographic axis of which is selected to be perpendicular to a plane formed by optical paths of input and output lights in said prism.

5. An optical circulator according to claim 1 or 2 wherein at least one of said polarizing prisms is a multilayer film prism.

* * * * *